(12) United States Patent
Kayano et al.

(10) Patent No.: US 6,969,339 B2
(45) Date of Patent: Nov. 29, 2005

(54) CONTROL EQUIPMENT FOR A VEHICLE AND CONTROL METHOD THEREOF

(75) Inventors: Mitsuo Kayano, Hitachi (JP); Toshimichi Minowa, Mito (JP); Hiroshi Sakamoto, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/382,928

(22) Filed: Mar. 7, 2003

(65) Prior Publication Data

US 2003/0146028 A1 Aug. 7, 2003

Related U.S. Application Data

(63) Continuation of application No. 09/634,331, filed on Aug. 7, 2000, now Pat. No. 6,603,214.

(30) Foreign Application Priority Data

Aug. 5, 1999 (JP) ................................. 11-222059

(51) Int. Cl.[7] .............................................. B60K 41/02
(52) U.S. Cl. .......................... 477/80; 477/86; 477/116; 74/336 R
(58) Field of Search .............................. 477/79, 80, 86, 477/116; 74/336 R

(56) References Cited

U.S. PATENT DOCUMENTS

| | | | | |
|---|---|---|---|---|
| 4,517,859 A | * | 5/1985 | Nagaoka et al. | ............ 477/143 |
| 4,544,057 A | * | 10/1985 | Webster et al. | ............... 477/86 |
| 4,622,866 A | * | 11/1986 | Ito et al. | ...................... 477/122 |
| 4,627,312 A | | 12/1986 | Fujieda et al. | ................ 79/860 |
| 4,860,607 A | * | 8/1989 | Numazawa et al. | .......... 74/330 |
| 5,666,863 A | * | 9/1997 | Sunada et al. | ............. 74/731.1 |
| 6,257,081 B1 | * | 7/2001 | Gagnon et al. | ............... 74/335 |

FOREIGN PATENT DOCUMENTS

| | | | |
|---|---|---|---|
| JP | 58-207556 | 12/1983 | |
| JP | 63-83436 | * 4/1988 | ........... 74/336 R X |
| JP | 64-026055 | 1/1989 | |
| JP | 05-157163 | 6/1993 | |
| JP | 05-322022 | 12/1993 | |
| JP | 08-207625 | 8/1996 | |
| JP | 8207625 | 8/1996 | |
| JP | 10018876 | 1/1998 | |
| JP | 10-184885 | 7/1998 | |

OTHER PUBLICATIONS

David Scott, "Constant-mesh automatic nears production stage," *Automotive Engineering*, Sep. 1981, vol. 89, No. 9, pp. 104-109.

* cited by examiner

*Primary Examiner*—Ha Ho
(74) *Attorney, Agent, or Firm*—Crowell & Moring LLP

(57) ABSTRACT

A control device for a vehicle which has a function to reduce the change-speed shock when changing the speed by controlling the transmission of the vehicle. The control device performs the switching between a manual change-speed mode in which the vehicle speed can be changed based on a change-speed command generated by manual operation and an automatic change-speed mode in which a transmission gear ratio can be controlled based on the predetermined change-speed characteristic. Thereby the reduction amount of the change-speed shock can be changed between the manual change-speed mode and the automatic change-speed mode.

4 Claims, 15 Drawing Sheets

CONTROL EQUIPMENT FOR A VEHICLE AND CONTROL METHOD THEREOF

BACKGROUND OF THE INVENTION

The present invention relates to a control device for a vehicle which can change the speed by the manual operation change-speed in addition to an automatic change-speed based on a usual shift map.

In the prior art, an automatic transmission performs automatically performs the change-speed operation by retrieving the shift map using detection values such as a vehicle speed and an engine load as a parameter, and selecting and establishing the optimum speed range.

In such an automatic transmission, it is difficult to select the optimum speed range in all kinds of states of running, because the change-speed characteristic is set based on a general state of running. There is a problem that the speed range is uniformly decided, although the control amount of the accelerator pedal and the opening of the throttle valve are detected to reflect the will of a driver.

Moreover, although there is the change-speed characteristic in which a high value is put on the fuel consumption, or the one in which a high value is put on the power performance, neither is difficult to that the change-speed characteristic corresponding to the favor of the driver is completely achieved.

Then, the automatic transmission for the driver to be able to operate the switch and the lever and to select arbitrary speed range is proposed.

Moreover, the one to reduce the engine torque in order to reduce the change-speed shock when changing the speed is proposed in the Japanese Patent Application Laid-Open No. 58-207556.

In these ones, the engine torque is reduced by using the number of revolutions of the transmission input shaft or the engine speed where the number of revolutions changes based on the output of the timer or when changing the speed, as a parameter. Thus, the amount of the reduction of the engine torque was constant, or a set value corresponding to the engine load.

As is disclosed in the Japanese Patent Application Laid-Open No. 58-207556, the change-speed shock is reduced naturally in the manual change-speed mode when the reduction control for the engine torque is applied to the automatic transmission with a manual change-speed mode. However, there is a problem of being not able to obtain the change-speed feeling (direct feeling and vivid running) which a driver intends in the manual change-speed mode in that the sports running is assumed to be main purpose, and becoming a heavy change-speed feeling.

SUMMARY OF THE INVENTION

The present invention provides a control device for a vehicle which has a function to reduce the change-speed shock when changing the speed by controlling the transmission of the vehicle. The control device performs the switching between a manual change-speed mode in which the vehicle speed can be changed based on a change-speed command generated by manual operation and an automatic change-speed mode in which a transmission gear ratio can be controlled based on the predetermined change-speed characteristic. Thereby the reduction amount of the change-speed shock can be changed between the manual change-speed mode and the automatic change-speed mode.

As a result, it is able to obtain the change-speed feeling (direct feeling and vivid running) which a driver intends while reducing the change-speed shock, even if the transmission mode is switched from the automatic change-speed mode to the manual change-speed mode.

DETAILED DESCRIPTION OF THE PROFFERED EMBODIMENTS

A control device for a vehicle according to one embodiment of the present invention will be explained hereinafter with reference to FIGS. 1 to 15.

An embodiment of the whole construction of the vehicle which uses the control device for a vehicle will be explained with reference to FIG. 1.

Figure 1:
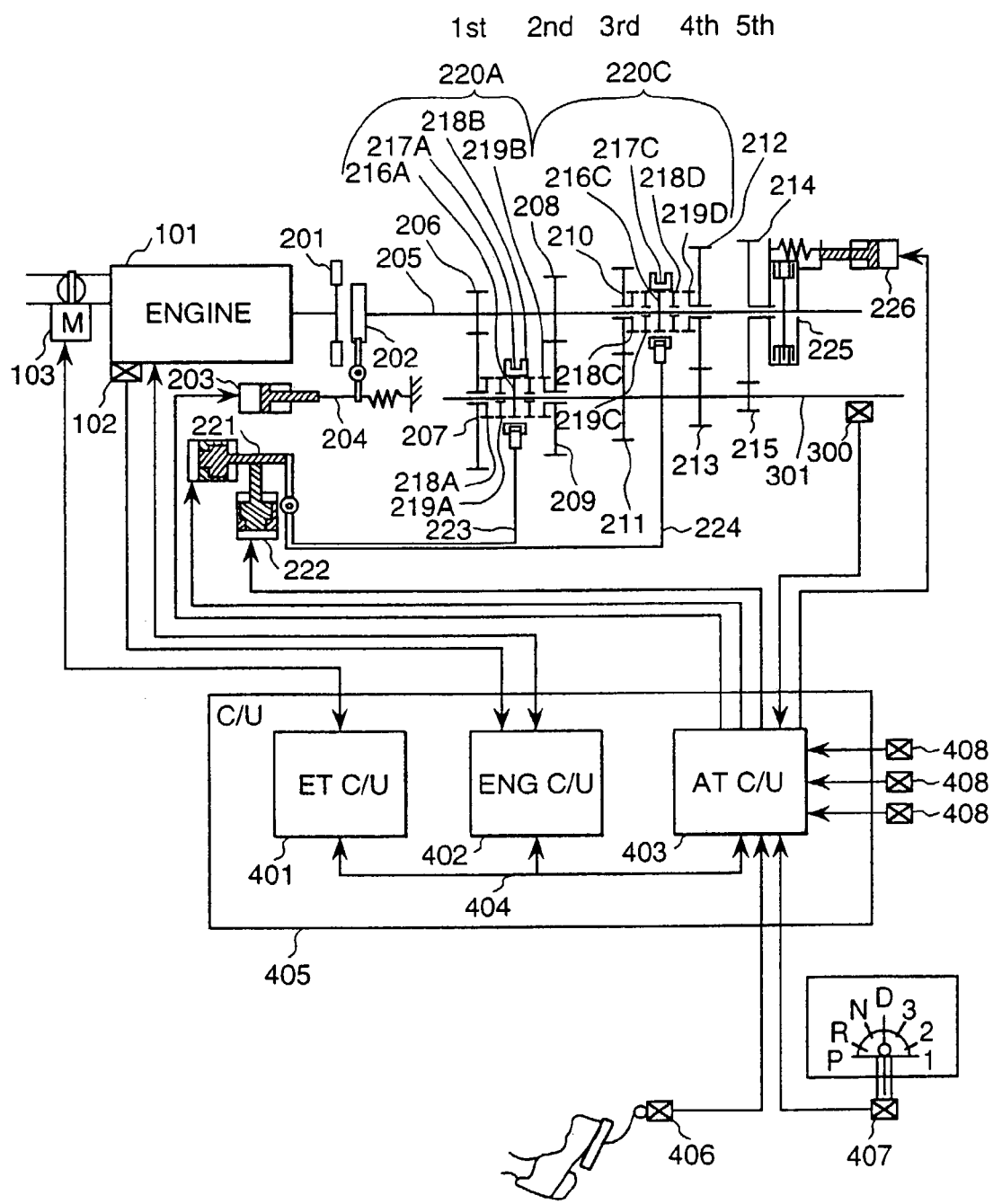
FIG. 1 shows the whole construction of the vehicle which uses the control device for a vehicle according to one embodiment of the present invention.

In the embodiment shown in FIG. 1, an engine is used as a power generating unit, and a gear type transmission as a power transmitting unit.

A control unit (C/U) 405 is provided with an electronically controlled throttle control unit (ETC/U) for controlling an electronically controlled throttle 103, an engine control unit (ENGC/U) 402 for controlling an engine 101, and a transmission control unit (ATC/U) 403 for controlling a transmission.

The engine 101 has an engine speed sensor 102 for detecting the engine speed, and an electronically controlled throttle 103 for adjusting the engine torque. The engine 101 is controlled by the engine control unit (ENGC/U) 402. The electronically controlled throttle 103 is controlled by the electronically controlled throttle control unit (ETC/U) 401.

The gear type transmission comprises a flywheel 201, a start clutch 202, a start clutch actuator 203, a wire 204, an input shaft 205, an output shaft 301, gears 206, 207, 208, 209, 210, 211, 212, 213, 214, 215, a dog clutch 220A for 1st–2nd gear speed, a dog clutch 220C for 3rd–4th gear speed, a shift actuator 221, a selection actuator 222, a shift fork 223, 224, a change-speed clutch 225, a change-speed clutch actuator 226, and a revolutions number sensor 300 for the output shaft. The dog clutch for 1st–2nd gear speed comprises a clutch hub 216A, a sleeve 217A, synchronizer rings 218A, 218B, and gear splines 219A, 219B. Further, the dog clutch for 3rd–4th gear speed comprises a clutch hub 216C, a sleeve 217C, synchronizer rings 218C, 218C, and gear splines 219C, 219C.

Actuators 203, 221, 222, 226 which composes the gear type transmission is controlled by the oil pressure or a motor based on a signal from the transmission control unit (ATC/U) 403.

The engine torque output from engine 101 is transmitted to the input shaft 205 of the gear type transmission through the flywheel 201 and the start clutch 202. Next, the engine torque is transmitted to the output shaft 301 through either of gears 206, 207, 208, 209, 210, 211, 212, 213, 214, 215, and finally transmitted to tires in order to run the vehicle. The start clutch 202 which transfers the engine torque to the input shaft 205 of the gear type transmission, is engaged or disengaged by the start clutch actuator 203 in order to control the transmissibility of the engine torque.

The run between the 1st and the 4th gear speed is determined by moving either of gears 210, 212 rotatable to the input shaft 205 or gears 207, 209 rotatable to the output shaft 301, namely sleeves 217A, 217C of mating clutches (ex. Dog clutches) 220A, 220C by shift forks 223, 224, and engaging either of gear splines 219A, 219B, 219C, 219D with clutch hub 216A, 216C. The shift forks 223, 224 is driven by the shift actuator 221 and the selection actuator 222. Further, there are provided the synchronizer rings 218A, 218B, 218C, 218D in order to synchronize the clutch hubs 216A, 216C with the gear splines 219A, 219B, 219C, 219D.

When the transmission is at the 1st gear speed, the driving shaft torque of the input shaft 205 is transmitted to an output shaft 301 through the gear 206—the gear 207—the clutch hub 216A. The gear 207 and the clutch hub 216A are connected to each other by the sleeve 217A. When the transmission is at the 2nd gear speed, the driving shaft torque of the input shaft 205 is transmitted to the output shaft 301 through the gear 208—the gear 209—the clutch hub 216A. The gear 209 and the clutch hub 216A are connected by the sleeve 217A. When the transmission is at the 3rd gear speed, the driving shaft torque of the input shaft 205 is transmitted to the output shaft 301 through the clutch hub 216C—the gear 210—the gear 211. The gear 210 and the clutch hub 216C are connected by the sleeve 217C. When the transmission is at the 4th gear speed, the driving shaft torque of the input shaft 205 is transmitted to the output shaft 301 through the clutch hub 216C—the gear 212—the gear 213. The gear 207 and the clutch hub 216A are connected by the sleeve 217A.

As mentioned above, the dog clutches 220A, 220C are provided in each of gears from 1st to 4th gear speed. Only one gear is engaged by the dog clutches 220A, 220C while running, and others are disengaged.

Further, the 5th gear speed can be obtained by engaging the input shaft 205 with the gear 214$b$ by the change-speed clutch 225. The change-speed clutch 225 is driven by the change-speed clutch actuator 226. It is possible to prevent a driver from feeling heavy or to prevent an engine from reving up suddenly by controlling change-speed clutch 225, thus controlling the transmission torque while changing the speed.

Signals from vehicle sensors such as an accelerator pedal sensor 406 for detecting the control amount of an accelerator pedal, an inhibitor switch 407 for detecting the position of a shift lever, a output shaft revolution number sensor 300 for detecting the number of revolutions of the output shaft, a mode switch 408 for switching manual change-speed mode and automatic change-speed mode, a plus switch 409 for raising the speed range by one in the automatic change-speed mode, and a minus switch 410 for lowering the speed range by one in the manual change-speed mode, are input to the ATC/U 403 connected to the ENGC/U 402 and the ETC/U 401 through communication lines 404 such as a CAN (Control Area Network).

The ATC/U 403 understands the operating state from each signal taken, and controls the state of the start clutch and the position of the gear appropriately. The start clutch 202 is engagement-controlled during the run at a constant speed or the change-speed. Further, the ATC/U 403 controls electronically controlled throttle 103 through the ETC/U 401 so that the engine 101 may not rev up while changing the speed in the automatic change-speed mode. Further, ATC/U 403 controls electronically controlled throttle 103 and the change-speed clutch 225 to change smoothly from the transmission torque immediately before change-speed to the transmission torque immediately after change-speed. In addition, the correction value of the ignition time is sent from ATC/U 403 to ENGC/U 402 to control the ignition time. In the manual change-speed mode, the ATC/U 403 performs the control different from that in the automatic change-speed mode. Namely, the change-speed shock, change-speed time, and so on are changed between the manual change-speed mode and the automatic change-speed mode to set an appropriate value, thereby obtaining the sporty change-speed feeling which the driver intends. The start clutch 202 is engaged during the run at a constant speed or the change-speed.

Figure 2:
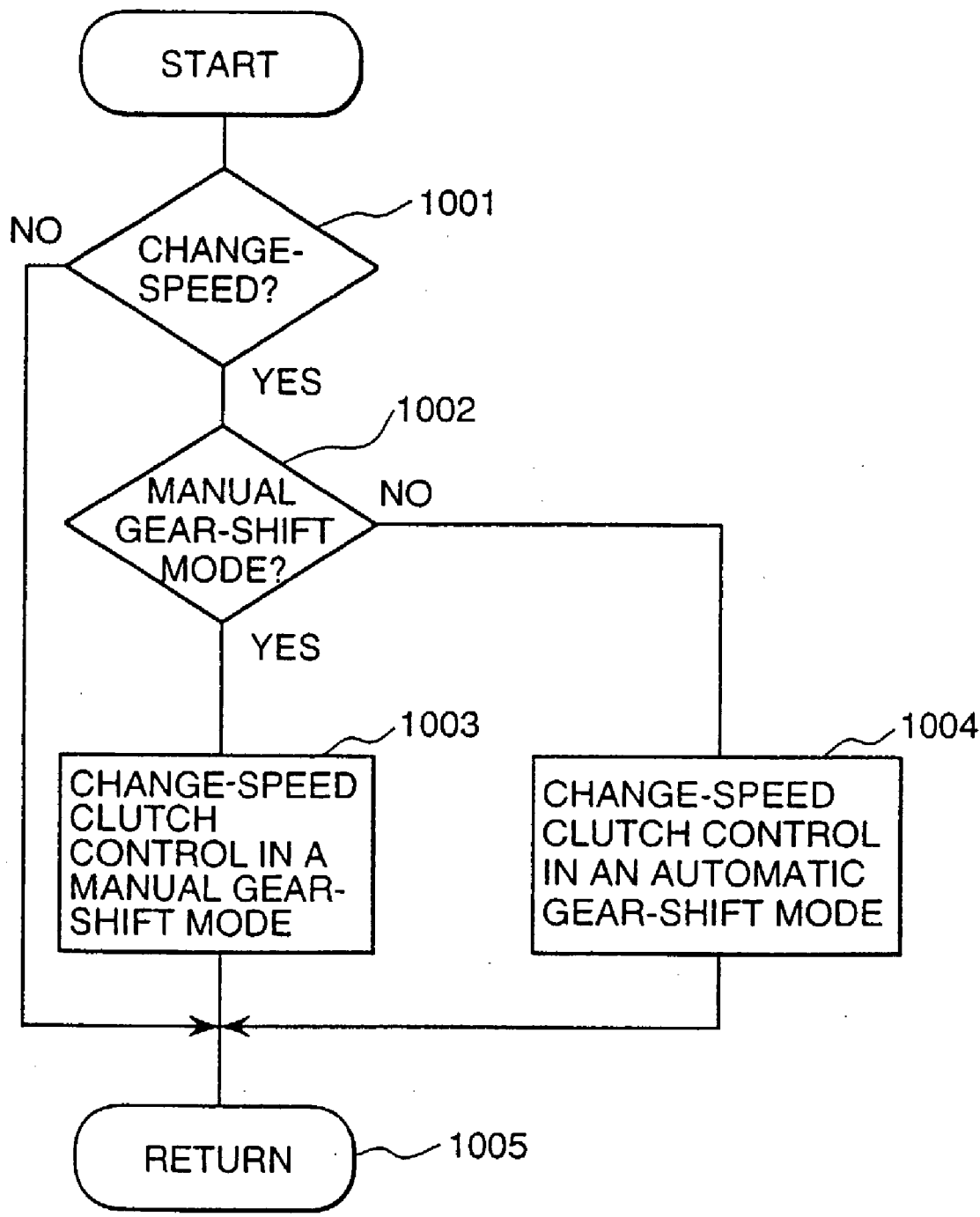
FIG. 2 shows a flow chart by which controls of the change-speed clutch 225 are switched between an automatic change-speed mode and a manual change-speed mode.

A flow chart by which the controls of the change-speed clutch 225 are switched between the automatic change-speed mode and the manual change-speed mode is shown in FIG. 2. This program is enabled and executed at a constant cycle of about 1–10 msec. In step 1001, it is determined whether there is a change-speed command. If not, then the change-speed control is not performed, and the processing is returned in step 1005. If there is a change-speed command, In step 1002, it is determined whether the operation is in the automatic change-speed mode or in the manual change-speed mode. If the operation is in the manual change-speed mode, then the change-speed clutch 225 is controlled in the manual mode in step 1003, and the processing is returned in step 1005. If the operation is in the automatic change-speed mode, then the change-speed clutch 225 is controlled in the automatic mode in step 1004, and the processing is returned in step 1005. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 3:
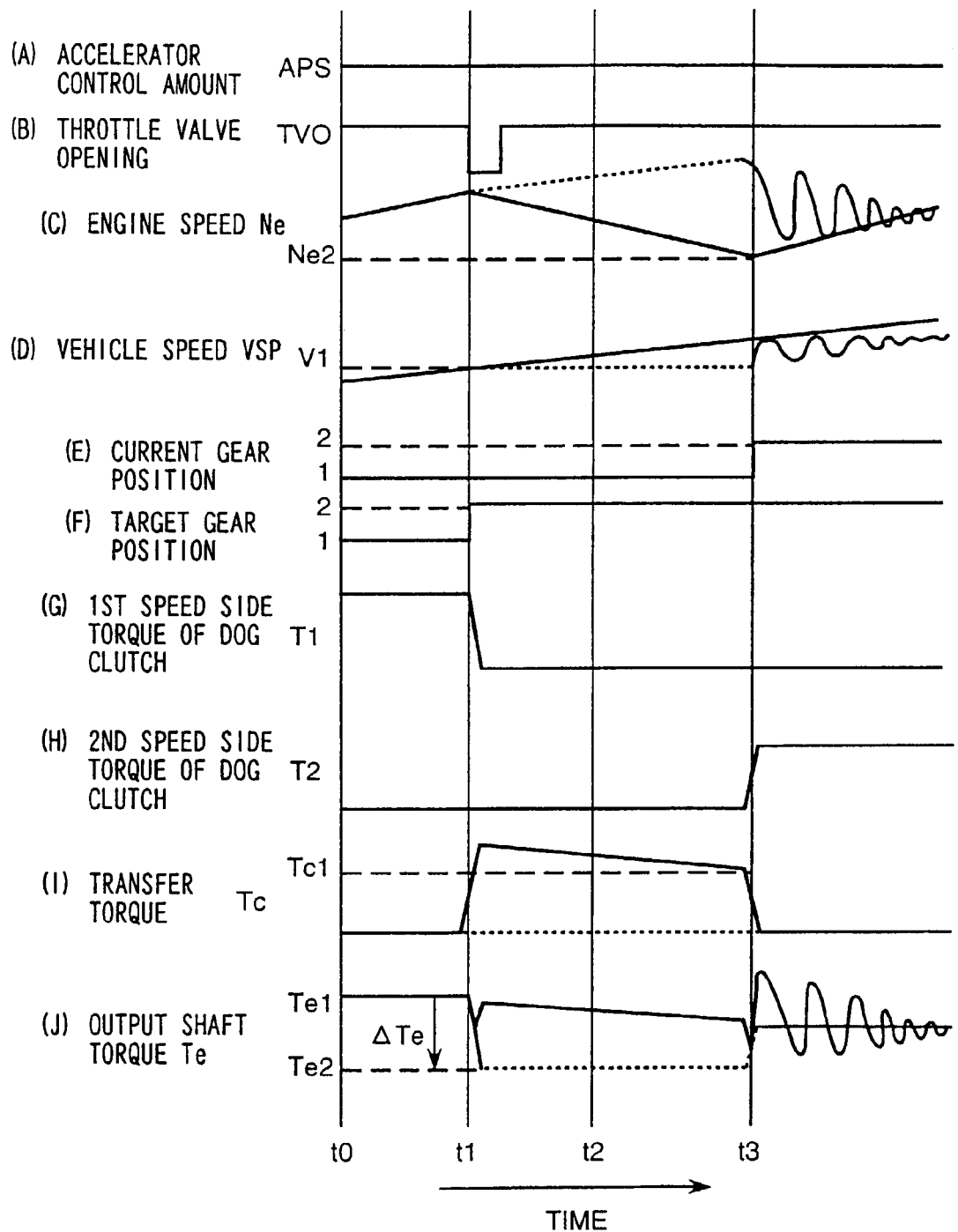
FIG. 3 shows an example of the time chart of the change-speed operation by which the controls of change-speed clutch 225 are switched between the automatic change-speed mode and the manual change-speed mode.

An example of the time chart of the change-speed operation by which the controls of change-speed clutch 225 are switched between the automatic change-speed mode and the manual change-speed mode is shown in FIG. 3. This figure shows an example of the up-shift change-speed from 1st gear speed to 2nd gear speed. The solid line designates the operation of each part in the automatic change-speed mode, and the dashed line designates a manual change-speed mode. The axis of abscissa designates time.

The accelerator pedal control amount APS is assumed to be constant as shown in (A) of FIG. 3. The throttle opening TVO is assumed to be a function of the control amount APS of the accelerator pedal excluding while changing the speed. For instance, the throttle opening TVO=a*accelerator pedal control amount APS+b (a and b are constants). As shown in (B) FIG. 3, assuming that the throttle opening TVO is constant at time t0 to time t1, as shown in (C) and (D) of FIG. 3, engine speed Ne and vehicle speed VSP increase. And then, as shown in (F) of FIG. 3, the target gear position changes from the 1st gear speed into the 2nd gear speed and the change-speed begins at time t1, when the vehicle speed VSP becomes a fixed speed and it meets the change-speed requirement.

When the change-speed begins, the throttle opening TVO is first shut momentarily as shown in (B) of FIG. 3. Further, the gear 207 is disengaged by the 1st–2nd gear speed dog clutch 220A and the torque of the dog clutch on the 1st gear speed side is adjusted to be 0, as shown in (G) of FIG. 3. Naturally, the 3rd–4th gear speed dog clutch 220C is at a neutral position. At this time, the load imposed to change-speed clutch 225 is raised in the automatic change-speed mode. This imposed load is obtained from the engine torque characteristic. This imposed load functions so that the output shaft torque bridging before the beginning of the change-speed to after the end of the change-speed may be allowed to change smoothly. On the other hand, the imposed load is not applied to change-speed clutch 225 in the manual change-speed mode, and the output shaft torque under the change-speed is adjusted to be 0 as shown in (J) of FIG. 3.

Next, as shown in (H) of FIG. 3, the gear 209 is engaged by the 1st–2nd gear speed dog clutch 220A at time t3 so that the dog clutch torque on the 2nd gear speed side can be transmitted. At the same time, the change-speed clutch 225 is disengaged in the automatic change-speed mode as shown in (I) of FIG. 3, and the change-speed clutch torque is adjusted to be 0.

By controlling the transmission as mentioned above, it becomes possible to change the speed without a heavy feeling and a change-speed shock in the automatic change-speed mode. As shown in (C) of FIG. 3, a driver feels the change-speed shock after time t3 in the manual change-speed mode, because the engine revs up quickly and the synchronization of the engine speed cannot be taken during the time t1 to t3. However, by controlling like this, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode. In addition, the consumption of the change-speed clutch 225 is reduced in the manual change-speed mode, and its durability is improved.

Figure 4:
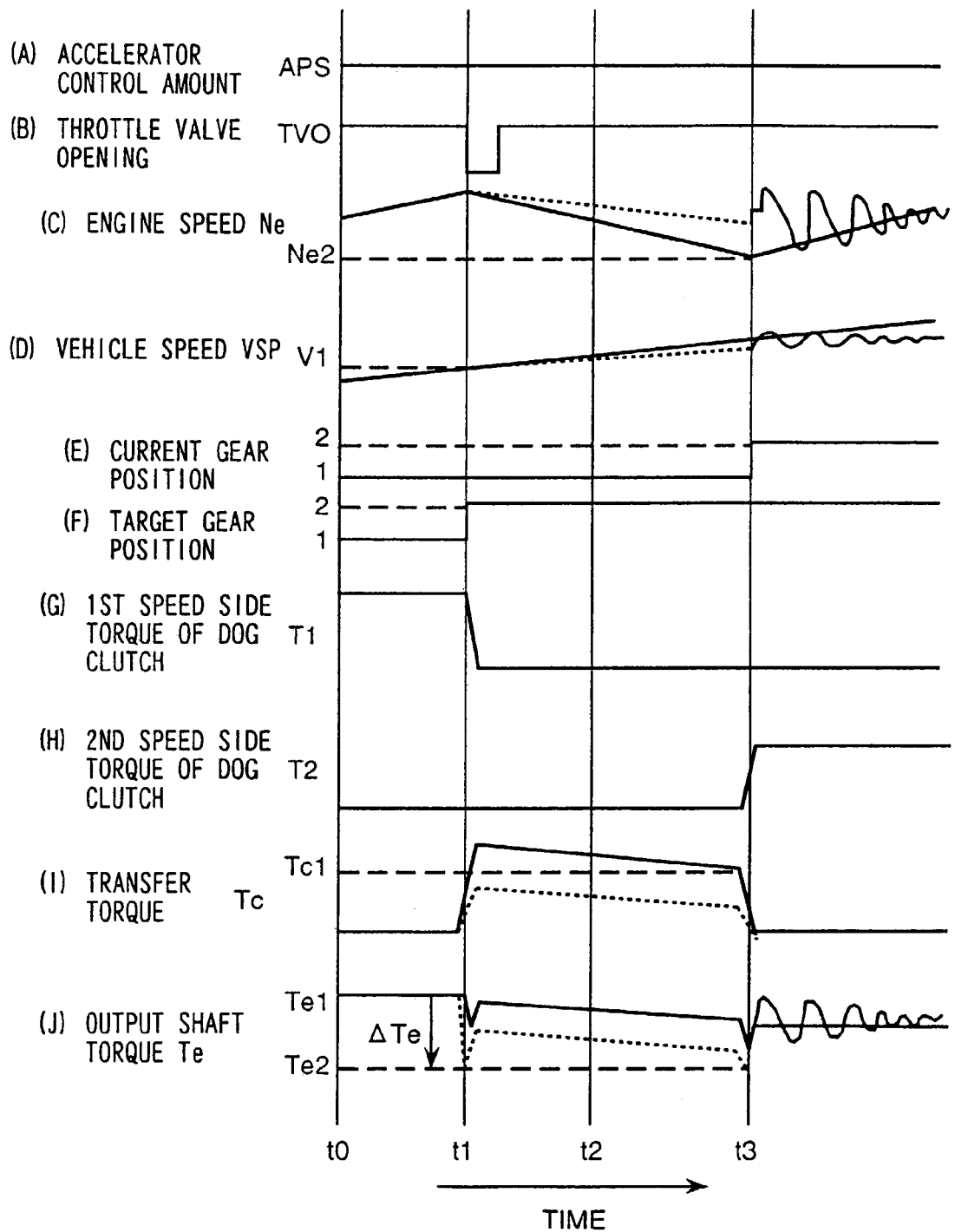
FIG. 4 shows an example of the time chart of the change-speed operation by which the controls of change-speed clutch 225 are switched between the automatic change-speed mode and the manual change-speed mode.

An example of the time chart of the change-speed operation by which the controls of change-speed clutch 225 are switched between the automatic change-speed mode and the manual change-speed mode is shown in FIG. 4. The operation of the automatic change-speed mode is similar to FIG. 3. In the manual change-speed mode, an imposed load different from that in the automatic change-speed mode is applied to the change-speed clutch during time t1–t3 as shown in (I) of FIG. 4. When the transmission is controlled like this, the change-speed shock corresponding to the imposed load is occurred after time t3 in the manual change-speed mode, because the synchronization of the engine speed cannot be taken. This imposed load is obtained from the speed at which a plus switch 409 and a minus switch 410 are pushed, its strength and its frequency, a function of the imposed load put in the automatic change-speed mode, etc. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 5:
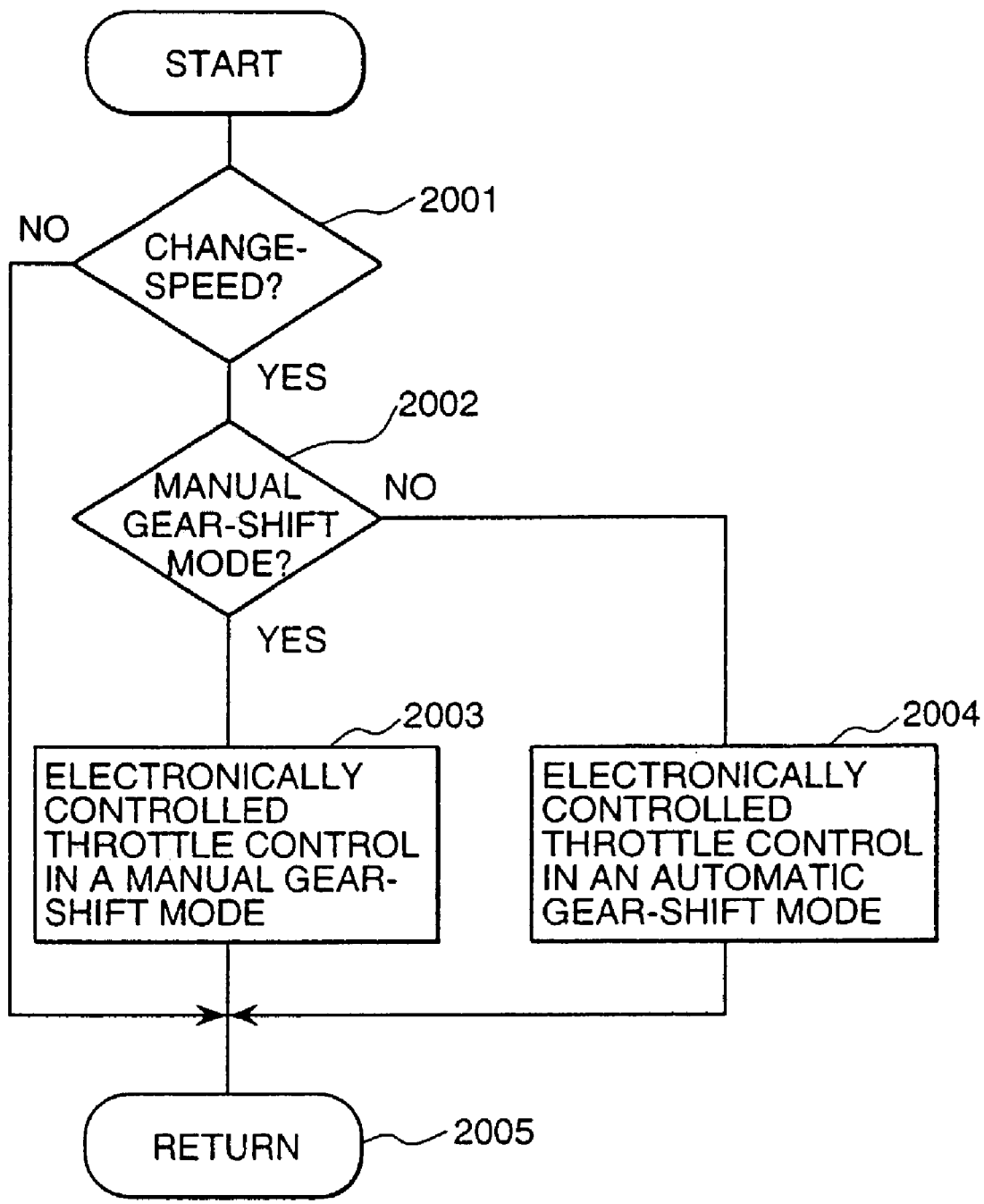
FIG. 5 shows a flow chart by which the controls of electronically controlled throttle 103 are switched between the automatic change-speed mode and the manual change-speed mode.

A flow chart by which the controls of electronically controlled throttle 103 are switched between the automatic change-speed mode and the manual change-speed mode is shown in FIG. 5. This program is enabled and executed at a constant cycle of about 1–10 msec. In step 2001, it is determined whether there is a change-speed command. If not, then the control of the change-speed is not performed, and the processing is returned in step 2005. If there is a change-speed command, In step 2002, it is determined whether the operation is in the automatic change-speed mode or in the manual change-speed mode. If the operation is in the manual change-speed mode, then the electronically controlled throttle 103 is controlled in the manual mode in step 2003, and the processing is returned in step 1005. If the operation is in the automatic change-speed mode, then the electronically controlled throttle 103 is controlled in the automatic mode in step 2004, and the processing is returned in step 2005. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 6:
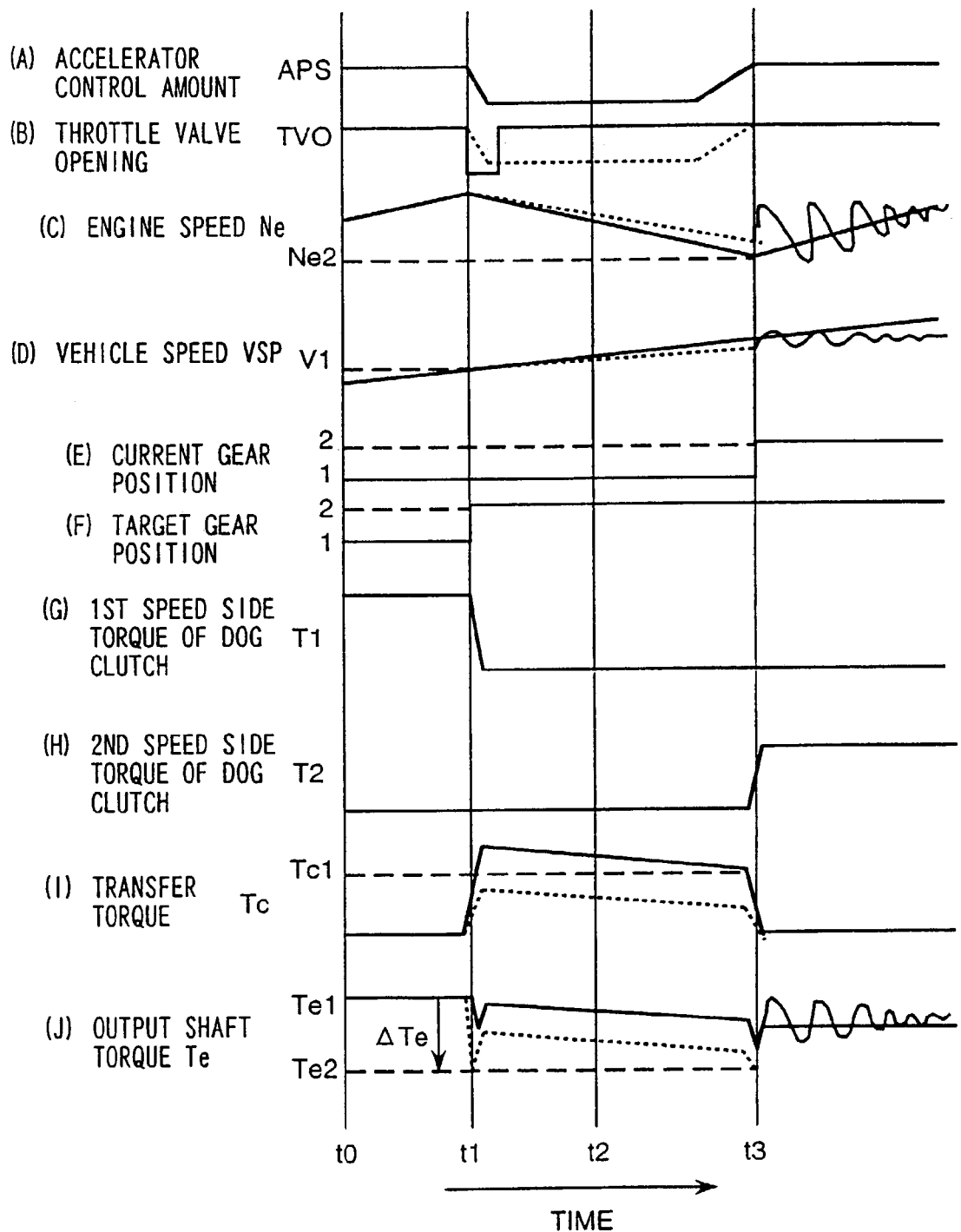
FIG. 6 shows an example of the time chart of the change-speed operation by which the controls of electronically controlled throttle 103 are switched between the automatic change-speed mode and the manual change-speed mode.

An example of the time chart of the change-speed operation by which the controls of electronically controlled throttle 103 are switched between the automatic change-speed mode and the manual change-speed mode is shown in FIG. 6.

The operation of the automatic change-speed mode is similar to FIG. 3. When the accelerator control amount APS is changed after the change-speed command is provided at time t1 as shown in FIG. 6(A), the throttle opening TVO is controlled according to the operational states, ex. the engine speed Ne during time t1 to t3 when changing the speed in the automatic change-speed mode as shown in (B) of FIG. 6. In a word, it is not reflected in throttle opening TVO for the driver to step on the accelerator or not to step. On the other hand, the throttle opening TVO is controlled as a function of the accelerator pedal control amount APS during time t1 to t3 when changing the speed in the manual change-speed mode as shown in (B) of FIG. 6. The change-speed clutch 225 is controlled based on either one of the time charts shown in FIGS. 3 and 4. Because the engine speed Ne, etc. can be decided by the driver's will or the accelerator pedal control amount while changing the speed, a sporty change-speed operation in which the driver's will is reflected can be obtained.

Figure 7:
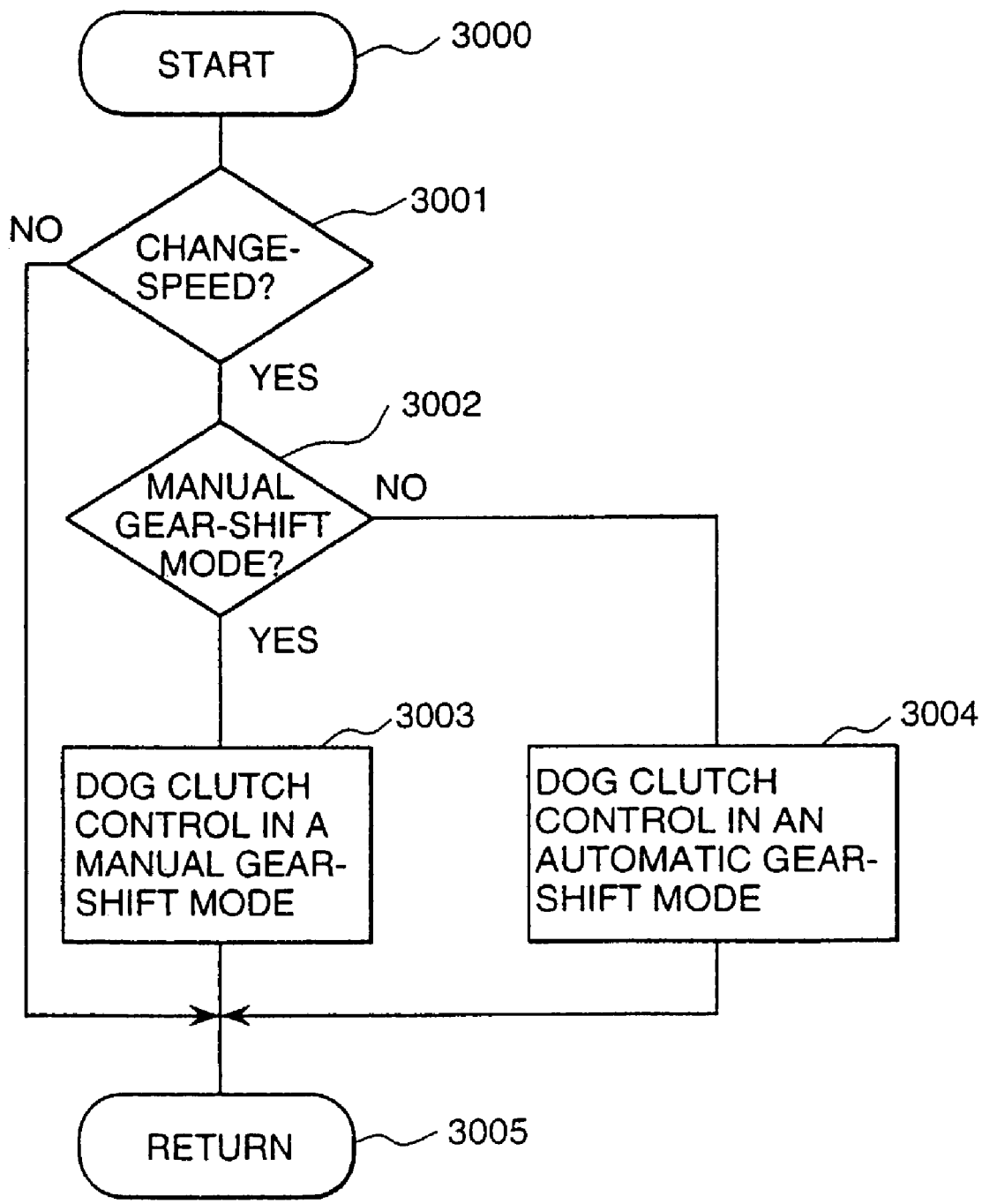
FIG. 7 shows a flow chart by which the controls of the dog clutches 220A and 220C are switched between the automatic change-speed mode and the manual change-speed mode.
Figure 8:
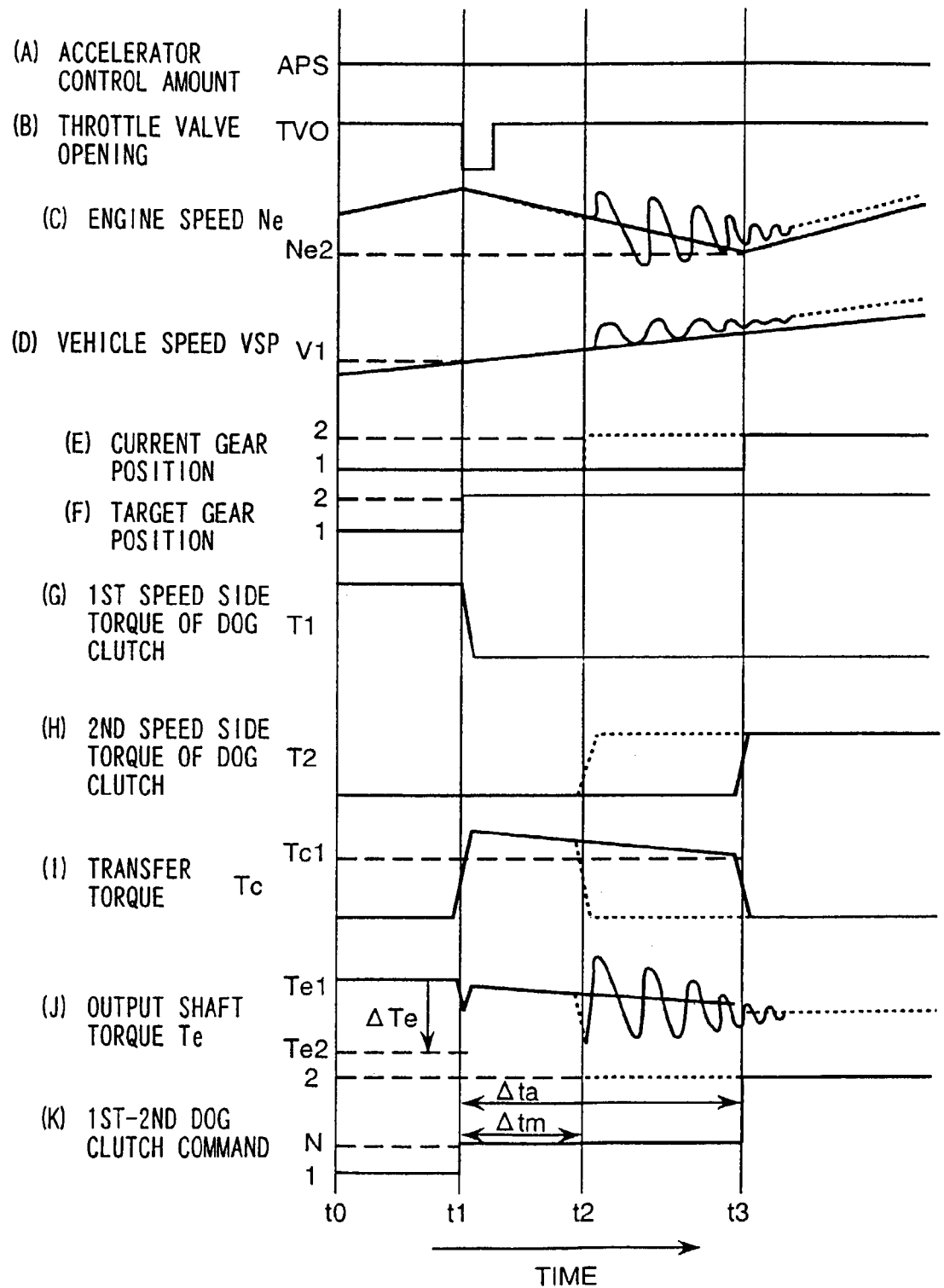
FIG. 8 shows an example of the time chart of the change-speed operation by which the control of the dog clutches 220A and 220C is switched between the automatic change-speed mode and the manual change-speed mode.

A flow chart by which the controls of the dog clutches 220A and 220C are switched between the automatic change-speed mode and the manual change-speed mode is shown in FIG. 7. This program is enabled and executed at a constant cycle of about 1–10 msec. In step 3001, it is determined whether there is a change-speed command. If not, then the change-speed control is not performed, and the processing is returned in step 3005. If there is a change-speed command, In step 3002, it is determined whether the operation is in the automatic change-speed mode or in the manual change-speed mode. If the operation is in the manual change-speed mode, then the dog clutches 220A and 220C are controlled in the manual mode in step 3003, and the processing is returned in step 3005. If the operation is in the automatic change-speed mode, then the dog clutches 220A and 220C are controlled in the automatic mode in step 3004, and the processing is returned in step 3005. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

An example of the time chart of the change-speed operation by which the control of the dog clutches 220A and 220C is switched between the automatic change-speed mode and the manual change-speed mode. The operation of the automatic change-speed mode is similar to FIG. 3. As shown in (K) of FIG. 8, neutral command time Δtm of the command of the 1st–2nd gear speed dog clutch is changed in the manual change-speed mode. As a result, the termination time of the change-speed is changed into time 0t2. This neutral command time Δtm can be obtained from the speed at which a plus switch 409 and a minus switch 410 are pushed, its strength and its frequency, a function of the neutral command time Δta given in the automatic change-speed mode, etc. It is also possible to set the neutral command time Δtm to 0 and delete the neutral command. By controlling like above, the change-speed shock can be occurred after the time t2, as shown in (J) of FIG. 8. As a result, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 9:
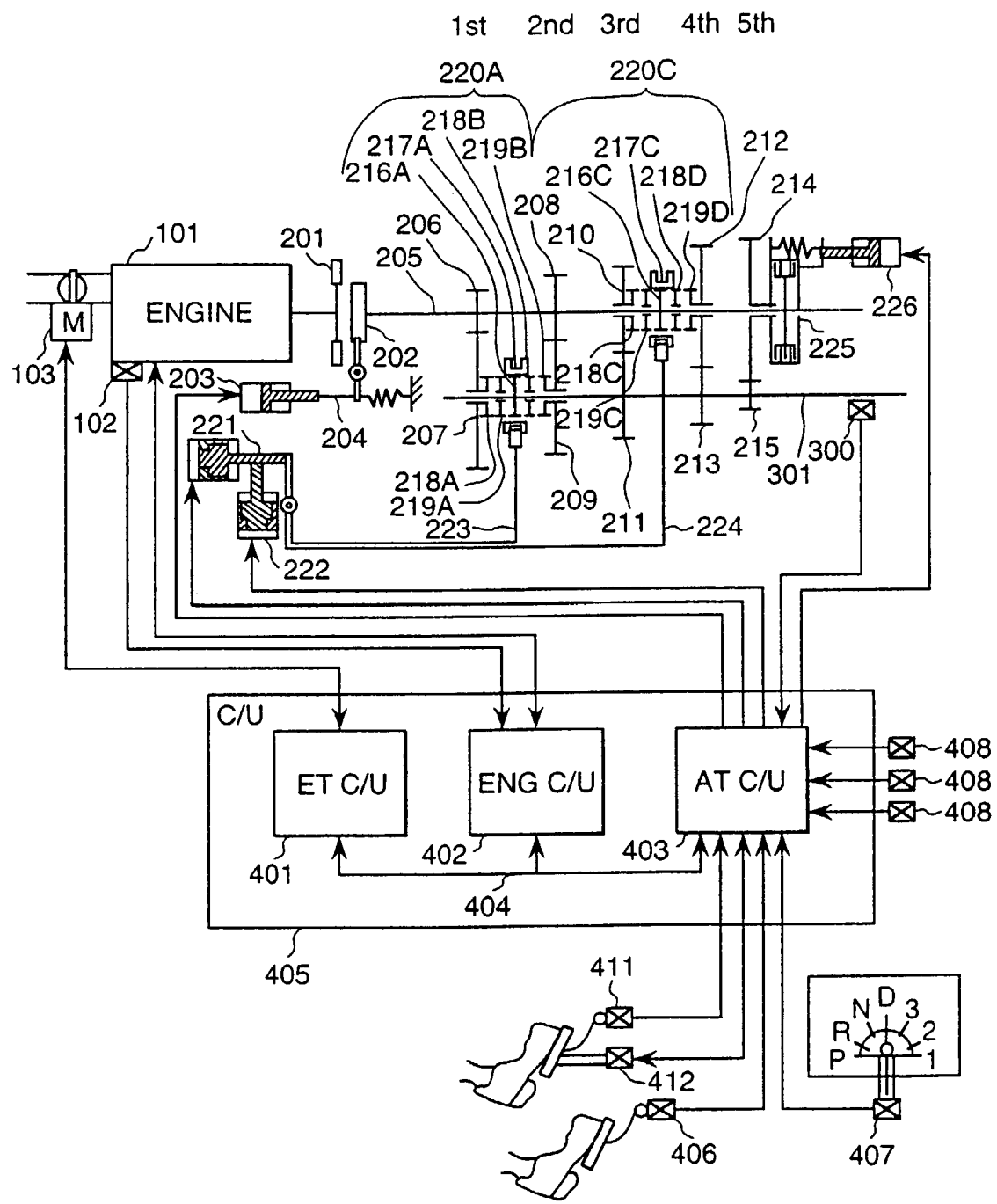
FIG. 9 shows the whole construction of the vehicle which uses the control device for a vehicle according to one embodiment of the present invention.

FIG. 9 shows the whole construction of the vehicle which uses the control device for a vehicle according to one embodiment of the present invention. In this embodiment, There is further provided a start clutch pedal sensor 411 for detecting a control amount of the start clutch pedal and a start clutch pedal actuator 412 for positioning the start clutch pedal and limiting its operation. The general operation is the same as FIG. 1. In addition to the general operation, a signal of the start clutch pedal sensor 411 is input to ATC/U403. In the manual change-speed mode, the ATC/U403 controls the start clutch actuator 203 according to an output signal from the start clutch pedal sensor 411, and engages/disengages the start clutch 202. By controlling like this, it becomes possible to perform a sporty change-speed operation which the driver intends, because the driver's will is reflected on the controls of the start clutch 202 in the manual change-speed mode. While, in the automatic change-speed mode, the ATC/U403 controls the start clutch pedal actuator 412 to fix the position of the start clutch pedal, and to make the control of start clutch 202 invalid. The fixed position of a start clutch pedal is located at the same level as the footrest. By controlling like this, it becomes sure to engage/disengage the start clutch and to run safely in the automatic change-speed mode. Further, a driver can drive in a relaxed manner, because the start clutch pedal can be used as a footrest.

Figure 10:
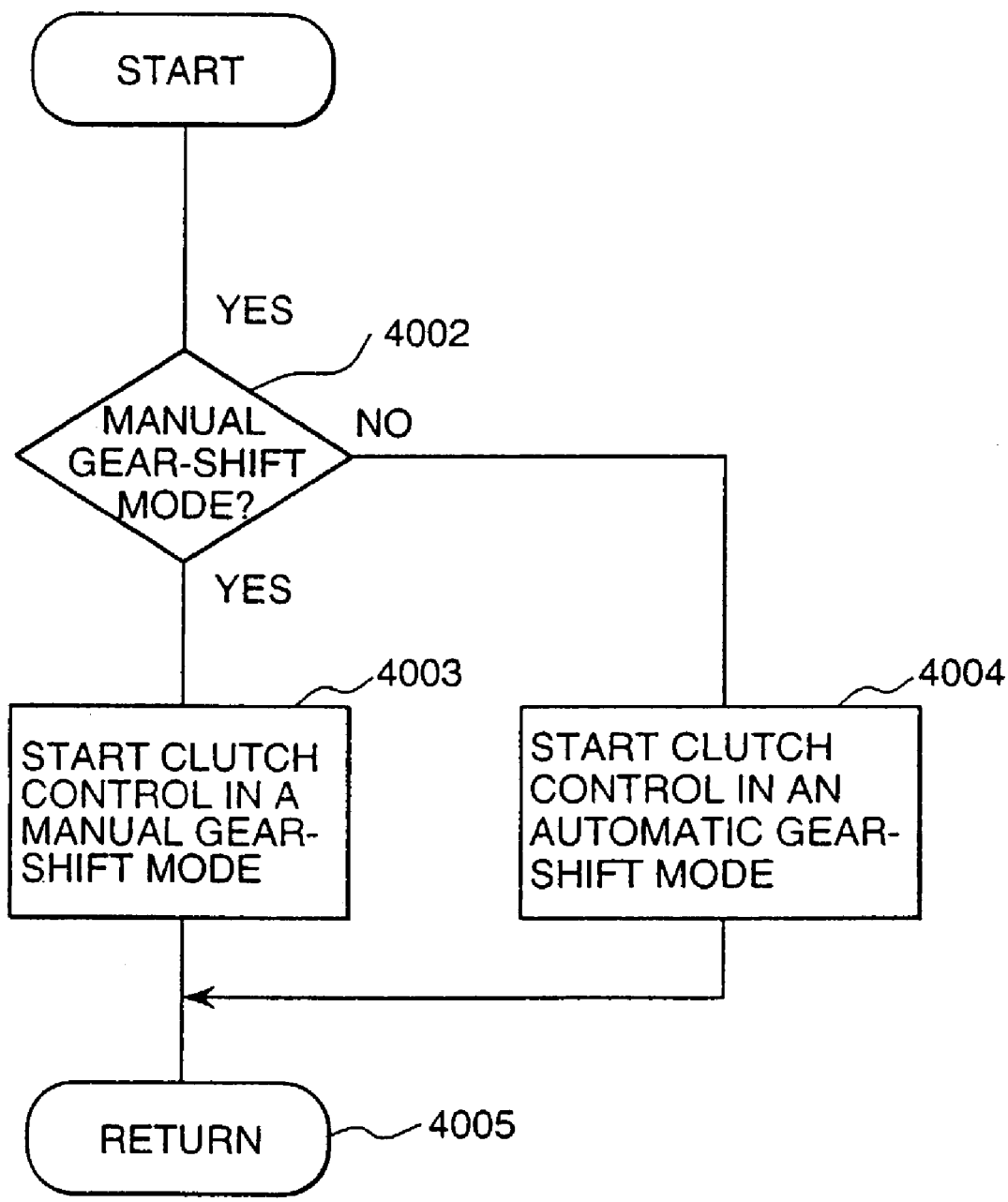
FIG. 10 shows a flow chart by which the controls of start clutch 202 are switched between the automatic change-speed mode and the manual change-speed mode.

A flow chart by which the controls of start clutch 202 are switched between the automatic change-speed mode and the manual change-speed mode is shown in FIG. 10. This program is enabled and executed at a constant cycle of about 1–10 msec. In step 4002, it is determined whether the operation is in the automatic change-speed mode or in the manual change-speed mode. If the operation is in the manual change-speed mode, then the start clutch 202 is controlled in the manual mode in step 4003, and then the processing is returned in step 4005. If the operation is in the automatic change-speed mode, then the start clutch 202 is controlled in the automatic mode in step 4004, and then the processing is returned in step 4005. By controlling like this, it becomes possible to perform a sporty change-speed operation which the driver intends, because the driver's will is reflected on the controls of the start clutch 202 in the manual change-speed mode.

Figure 11:
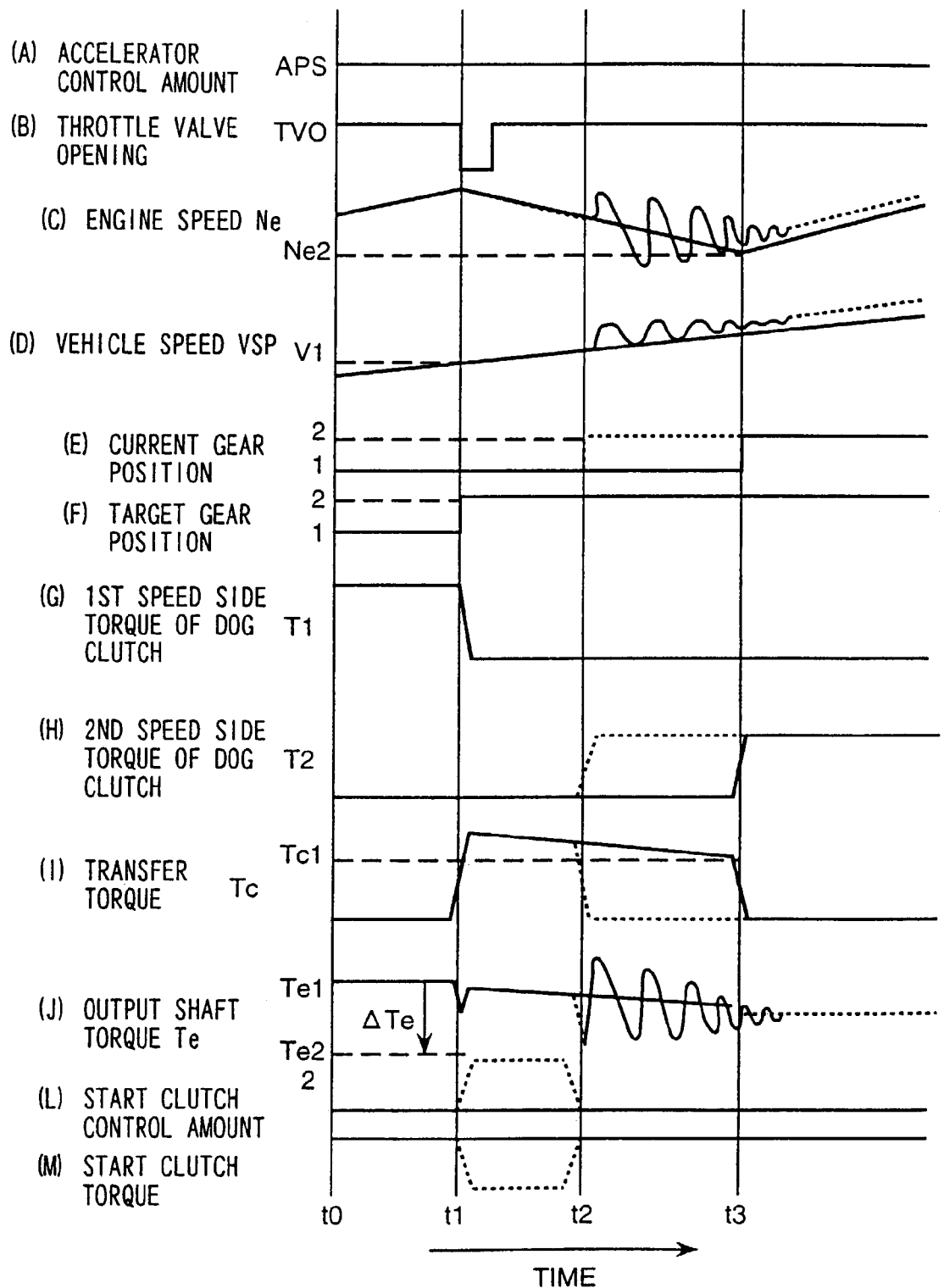
FIG. 11 shows a time chart of the change-speed operation by which the controls of start clutch 202 are switched between the automatic change-speed mode and the manual change-speed mode.

An example of the time chart of the change-speed operation by which the controls of start clutch 202 are switched between the automatic change-speed mode and the manual change-speed mode is shown in FIG. 11. The operation of the automatic change-speed mode is similar to FIG. 3. The ATC/U403 controls torque of the start clutch according to the control amount of the start clutch pedal during time t1 to t2 in the manual change-speed mode, as shown in (L) and (M) of FIG. 11. By controlling like this, it becomes possible to perform a sporty change-speed operation which the driver intends, because the driver's will is reflected on the controls of the start clutch 202 in the manual change-speed mode. While, in the automatic change-speed mode, the ATC/U403 controls the start clutch pedal actuator 412 to fix the position of the start clutch pedal, and to make the control of start clutch 202 invalid.

Figure 12:
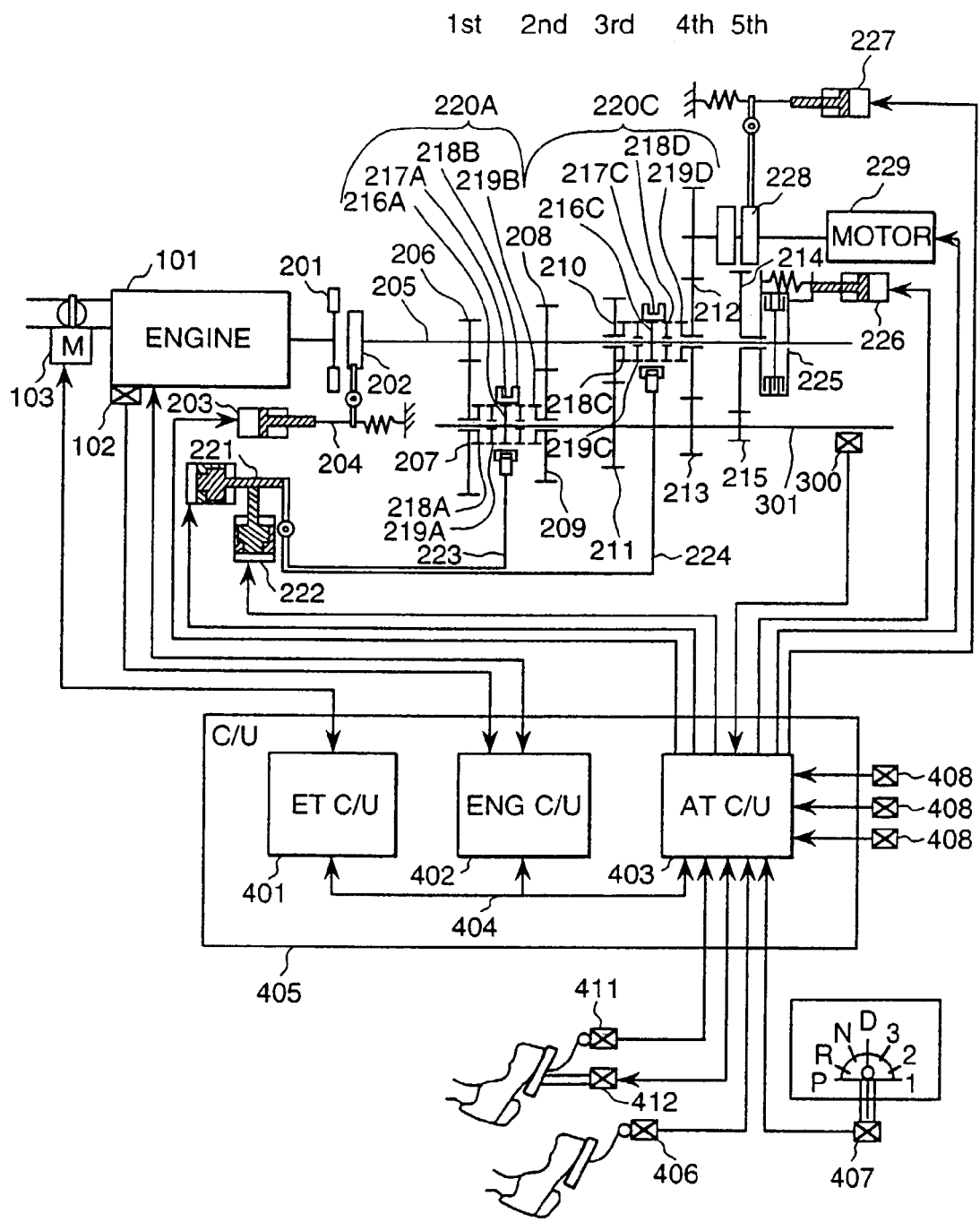
FIG. 12 shows the whole construction of the vehicle which uses the control device for a vehicle according to one embodiment of the present invention.

FIG. 12 shows the whole construction of the vehicle which uses the control device for a vehicle according to one embodiment of the present invention. In addition to the construction shown in FIG. 9, there are provided a motor generator 229 for outputting torque of the output shaft when starting or changing the speed, a motor generator clutch 228 for transmitting the output of the motor generator 229, and a motor generator clutch actuator 227 for controlling the motor generator clutch 228. The general operation is the same as that of FIG. 9. Further, in the manual change-speed mode, the motor generator 229 is controlled to generate a greater change-speed shock than in the automatic change-speed mode. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 13:
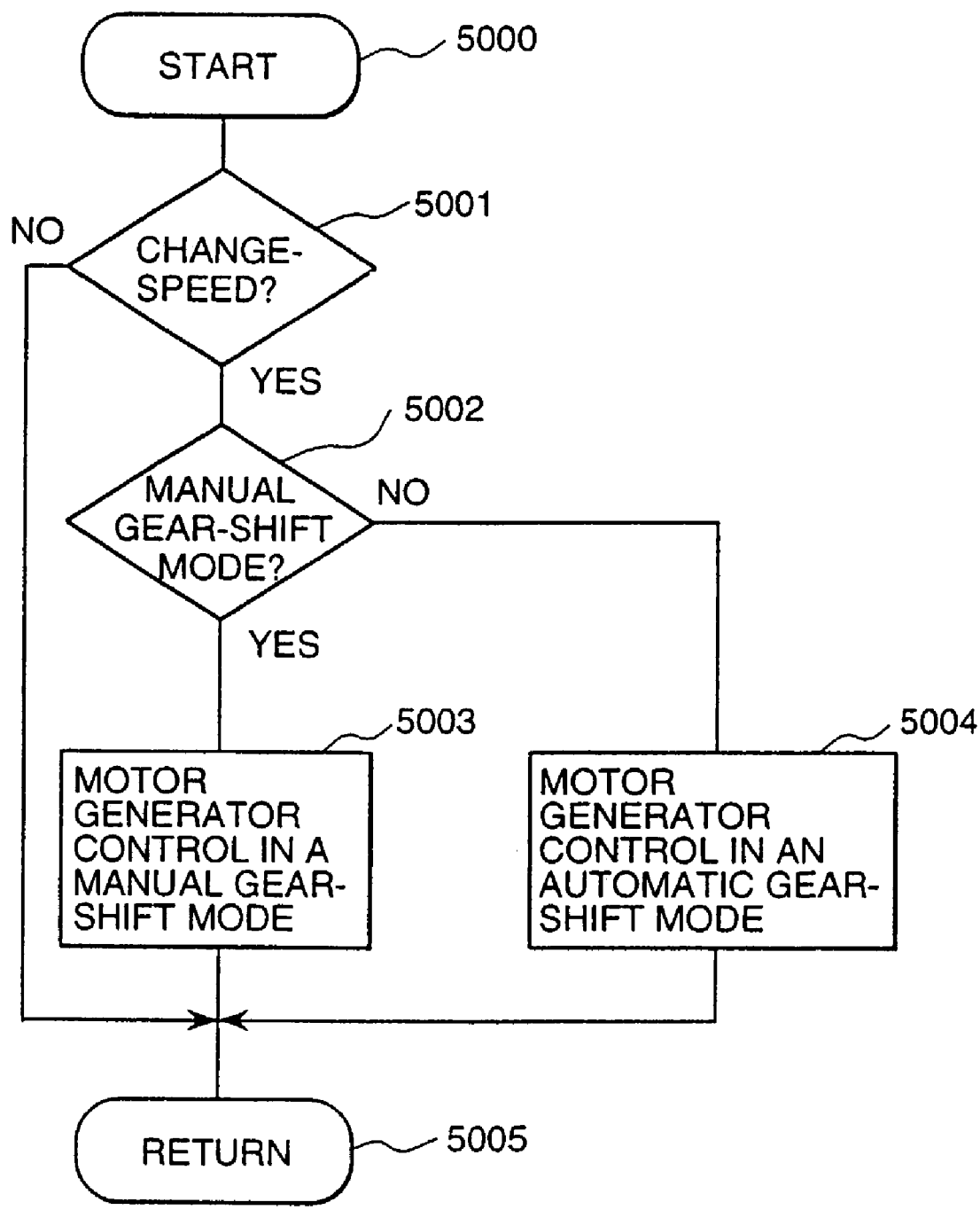
FIG. 13 shows a flow chart by which the controls of motor generator 229 are switched between the automatic change-speed mode and the manual change-speed mode is shown in FIG. 13.

A flow chart by which the controls of motor generator 229 are switched between the automatic change-speed mode and the manual change-speed mode is shown in FIG. 13. This program is enabled and executed at a constant cycle of about 1–10 msec. In step 5001, it is determined whether there is a change-speed command. If not, then the change-speed control is not performed, and the processing is returned in step 5005. If there is a change-speed command, In step 5002, it is determined whether the operation is in the automatic change-speed mode or in the manual change-speed mode. If the operation is in the manual change-speed mode, then the motor generator 229 is controlled in the manual mode in step 5003, and the processing is returned in step 5005. If the operation is in the automatic change-speed mode, then the motor generator 229 is controlled in the automatic mode in step 5004, and the processing is returned in step 5005. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 14:
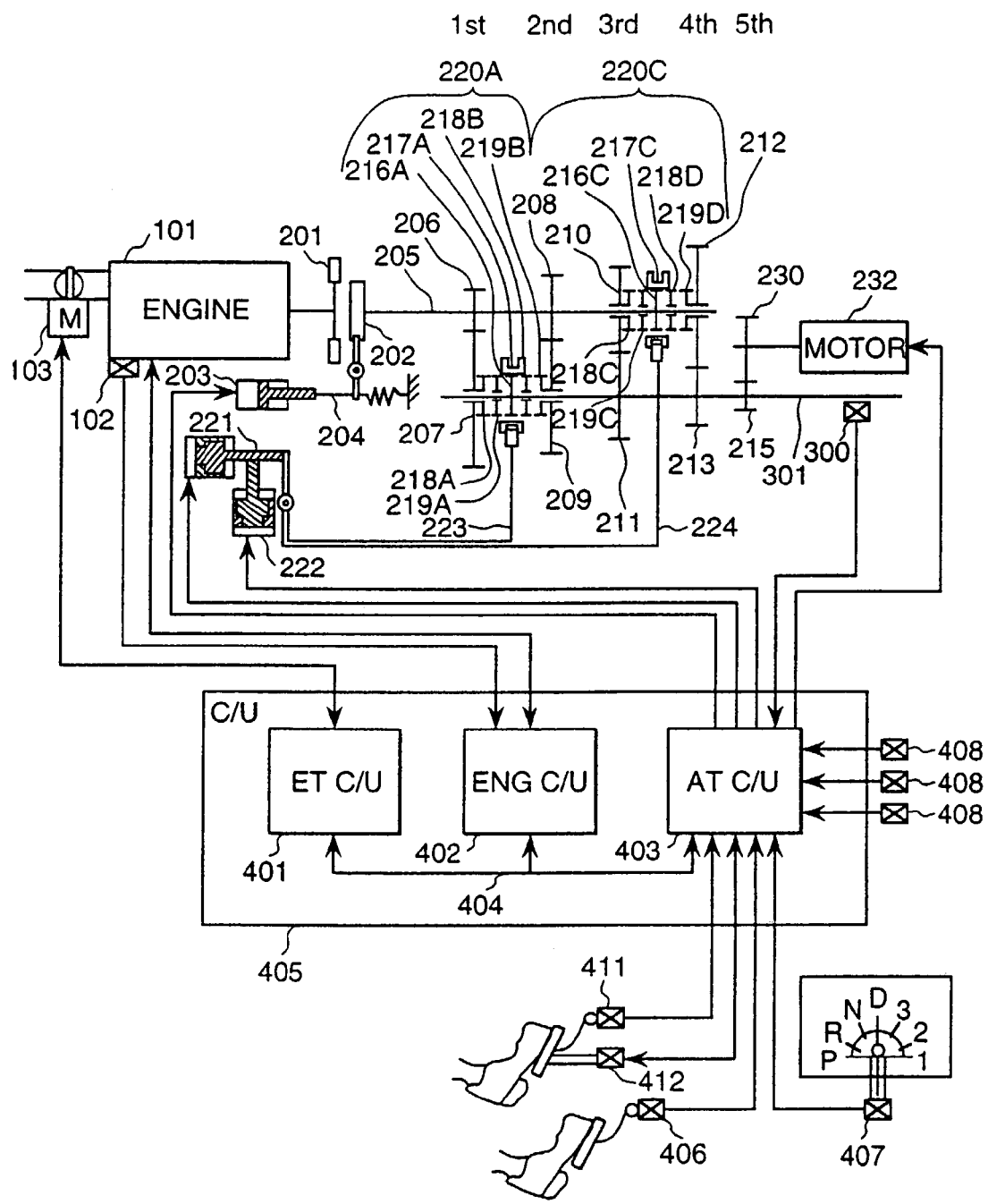
FIG. 14 shows the whole construction of the vehicle which uses the control device for a vehicle according to one embodiment of the present invention.

FIG. 14 shows the whole construction of the vehicle which uses the control device for a vehicle according to one embodiment of the present invention. In addition to the construction shown in FIG. 9, there is provided an assist motor 232 for outputting torque of the output shaft when starting or changing the speed. A change-speed clutch 225 is not provided. The general operation is the same as that of FIG. 9. Further, in the manual change-speed mode, the motor generator 229 is controlled to generate a greater change-speed shock than in the automatic change-speed mode. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

Figure 15:
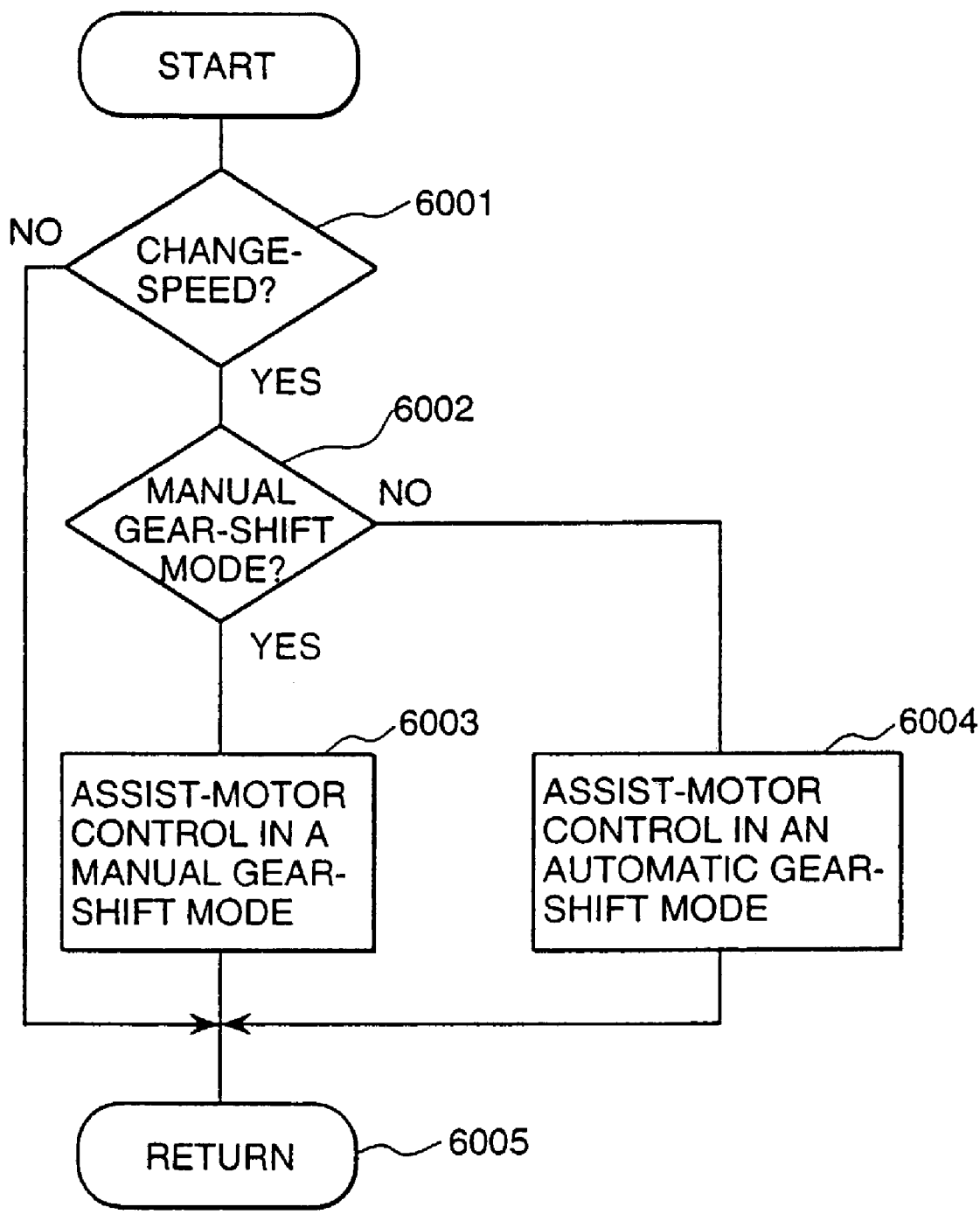
FIG. 15 shows a flow chart in which the controls of an assist motor 232 are switched between the automatic change-speed mode and the manual change-speed mode.

A flow chart in which the controls of an assist motor 232 are switched between the automatic change-speed mode and the manual change-speed mode is shown in FIG. 15. This program is enabled and executed at a constant cycle of about 1–10 msec. In step 6001, it is determined whether there is a change-speed command. If not, then the change-speed control is not performed, and the processing is returned in step 6005. If there is a change-speed command, In step 6002, it is determined whether the operation is in the automatic change-speed mode or in the manual change-speed mode. If the operation is in the manual change-speed mode, then the assist motor 232 is controlled in the manual mode in step 6003, and the processing is returned in step 6005. If the operation is in the automatic change-speed mode, then the assist motor 232 is controlled in the automatic mode in step 6004, and the processing is returned in step 6005. By controlling like above, it becomes possible to reduce the change-shock and to make the change-speed operation smooth in the automatic change-speed mode. Further, it becomes possible to perform a sporty change-speed operation with the appropriate change-speed shock which the driver intends in the manual change-speed mode.

What is claimed is:

1. A control device for a vehicle, wherein the control device comprises a start clutch for transmitting an engine torque to an input shaft, a shift clutch for transmitting said engine torque from said input shaft to an output shaft, and a gear transmission coupling selectively connecting a plurality of gears to a plurality of dog clutches to form a transmission passage route of torque from said input shaft to said output shaft, wherein the control device further comprises a function for switching between an automatic shift mode, in which a shift ratio is selected automatically according to a predetermined set of shift characteristics, and a manual shift mode, in which a shift ratio is selected according to a manual operation, wherein a shift shock reduction amount is varied during switching from a first coupling to a second coupling of said gears and said dog clutches, by controlling said shift clutch, according to said automatic shift mode and said manual shift mode, and wherein the vehicle comprises an accelerator pedal, and wherein the control device controls the torque of said engine independently of a depression magnitude of said accelerator pedal in said automatic shifting mode, and dependently of the depression magnitude of said accelerator pedal in said manual shifting mode.

2. A control device according to claim 1, wherein said shift shock reduction amount is smaller in said manual shift mode than in said automatic shift mode.

3. A control device according to claim 1, wherein according to said manual shift mode and automatic shift mode, a time for switching from said first coupling of said gears and dog clutches to said second coupling is varied.

4. A control device according to claim 1, wherein during a coupling of said gears and said dog clutches in said manual shift mode, a switching time for switching to said second coupling from said first coupling is shorter than said switching time during a coupling of said gears and said dog clutches in said automatic shift mode.

* * * * *